United States Patent [19]

Iizumi et al.

[11] Patent Number: 4,994,222
[45] Date of Patent: Feb. 19, 1991

[54] PROCESS FOR PRODUCING VULCANIZED RUBBER-SYNTHETIC RESIN COMPOSITE STRUCTURE

[75] Inventors: Shingo Iizumi, Yokohama; Kazuya Takano, Kamakura, both of Japan

[73] Assignee: Bridgestone Corporation, Tokyo, Japan

[21] Appl. No.: 354,033

[22] Filed: May 19, 1989

[30] Foreign Application Priority Data

Jun. 27, 1988 [JP] Japan .................................. 63-158271
Mar. 27, 1989 [JP] Japan .................................... 1-74572

[51] Int. Cl.⁵ ............................................... B29C 45/14
[52] U.S. Cl. ..................................... 264/135; 264/250; 156/333; 156/335
[58] Field of Search ............... 264/813, 134, 135, 236, 264/250, 255, 275, 279, 279.1, 328.2, 347; 156/333, 334, 335

[56] References Cited

U.S. PATENT DOCUMENTS

| | | | |
|---|---|---|---|
| 3,878,134 | 4/1975 | Ozelli | 156/335 |
| 3,944,523 | 3/1976 | Gobran | 156/334 |
| 4,111,880 | 9/1978 | Abendroth | 156/334 |
| 4,159,363 | 6/1979 | Elmer | 156/910 |
| 4,427,759 | 1/1984 | Gruetzmacher | 156/234 |
| 4,559,688 | 12/1985 | Abu-Isa | 264/255 |
| 4,718,837 | 1/1988 | Frazzell | 264/255 |
| 4,762,589 | 8/1988 | Akiyama | 156/335 |

*Primary Examiner*—Jay H. Woo
*Assistant Examiner*—Jeremiah F. Durkin, II
*Attorney, Agent, or Firm*—Kanesaka and Takeuchi

[57] ABSTRACT

A vulcanized rubber-synthetic resin composite structure is produced by injecting a molten synthetic resin into a mold in which a vulcanized rubber molding has been disposed. For improvement the surface of the vulcanized rubber molding which comes into contact with the synthetic resin is chrominated, and on the chlorinated surface a curable adhesive layer composed mainly of resol-type phenolic resin and aldehyde-modified polyvinyl alcohol is formed. Alternatively a curable adhesive layer composed mainly of chlorosulfonated polyethylene is formed the surface of the vulcanized rubber molding which comes into contact with the synthetic resin, to which the molten synthetic resin is injected while keeping the vulcanized rubber molding heated.

7 Claims, 1 Drawing Sheet

PROCESS FOR PRODUCING VULCANIZED RUBBER-SYNTHETIC RESIN COMPOSITE STRUCTURE

FIELD OF THE INVENTION AND RELATED ART STATEMENT

The present invention relates to a process for producing a vulcanized rubber-synthetic resin composite structure, and more particularly, to a process for producing a vulcanized rubber-synthetic resin composite structure in which the vulcanized rubber and the synthetic resin are bonded extremely firmly to each other.

Industrial rubber products are often used in the form of rubber-metal composite structure. Recently, metals for this purpose are being supplanted by the recently developed engineering plastics which have outstanding mechanical strength, heat resistance, oil resistance, and creep resistance. As the result, new application areas are being opened up by the rubber-synthetic resin composite structure.

An example of such application areas is the automotive suspension rod. The conventional metal rod with rubber bushings is being supplanted by the plastic rod with rubber bushings whose plan view is shown in FIG. 1 and whose sectional view taken through section 2—2 of FIG. 1 is shown in FIG. 2. There are shown a rod proper 2 made of plastics (such as polyamide resin), a bushing 3 made of vulcanized rubber, and a steel bearing 4. The rubber bushings 3 attached to both ends of the rod 1 are intended to reduce the torsional rigidity, and the rod 1 is joined to the automotive body through the bushings 3 and steel bearings 4.

The rubber-synthetic resin composite structure is usually produced by curing a desired part of unvulcanized rubber in contact with the surface of the synthetic resin moldings to which a chlorine-containing vulcanizable adhesive has been applied. According to the disclosure of Japanese Patent Laid-open No. 104717/1987, the plastic rod with rubber bushings as shown in FIGS. 1 and 2 is produced by disposing the bushings of vulcanized rubber in a mold and injecting a melt of a synthetic resin into the mold.

Needless to say, firm bonding between rubber and resin is very important for the rubber-resin composite structure. In the case of the plastic rod with rubber bushings, the plastic rod proper and the rubber bushing should be bonded extremely firmly to each other. Unfortunately, adhesion between rubber and plastics is poor, and a sufficient bond strength is not achieved by simply injecting a molten resin into a cavity surrounding the bushing of vulcanized rubber, as disclosed in above-mentioned Japanese Patent Laid-open No. 104717/1987.

A high adhesion strength is obtained when bonding is performed by curing unvulcanized rubber in contact with a synthetic resin molding. However, this bonding method has a disadvantage that the physical properties of the synthetic resin molding might be deteriorated by the heat history encountered in the curing step. Moreover, a resin molding having a low melting point might be deformed by the curing heat. An additional disadvantage is a comparatively high production cost. Therefore, the above-mentioned method is inefficient for the production of a composite structure (having a rubber bushing embedded in plastics) as shown in FIGS. 1 and 2.

OBJECTS AND SUMMARY OF THE INVENTION

The present invention was completed to solve the above-mentioned problems in the prior art. Accordingly, it is an object of the present invention to provide a process for producing a vulcanized rubber-synthetic resin composite structure in which the vulcanized rubber and the synthetic resin are bonded extremely firmly to each other. It is another object of the present invention to provide a process for producing a vulcanized rubber-synthetic resin composite structure easily and efficiently at a low production cost and with a high productivity, without causing the degradation and deformation of the synthetic resins by heat history.

The first aspect of the present invention is concerned with an improved process for producing a vulcanized rubber-synthetic resin composite structure by injecting a molten synthetic resin into a mold in which a vulcanized rubber molding has been disposed, wherein said improvement comprises chlorinating the surface of the vulcanized rubber molding which comes into contact with the synthetic resin, and forming on the chlorinated surface a curable adhesive layer composed mainly of resol-type phenolic resin and aldehyde-modified polyvinyl alcohol.

The second aspect of the present invention is concerned with an improved process for producing a vulcanized rubber-synthetic resin composite structure by injecting a molten synthetic resin into a mold in which a vulcanized rubber molding has been disposed, wherein said improvement comprises forming a curable adhesive layer composed mainly of chlorosulfonated polyethylene on the surface of the vulcanized rubber molding which comes into contact with the synthetic resin, and injecting the molten synthetic resin while keeping the vulcanized rubber molding heated.

The present inventors carried out a series of researches on the method of bonding vulcanized rubber and plastics firmly to each other. As the result, it was found that the object is achieved by injecting a molten resin into a mold in which is disposed a vulcanized rubber molding which has previously been treated for adhesion improvement. This finding led to the present invention.

DESCRIPTION OF THE PREFERRED EMBODIMENTS

Figure 1:
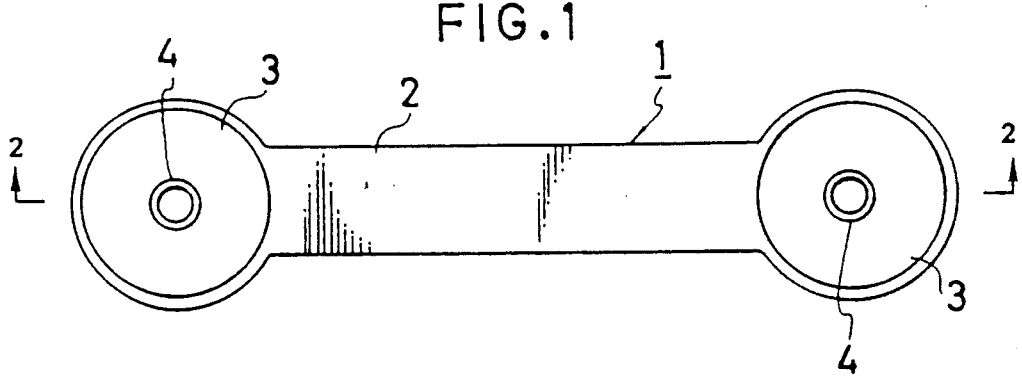
FIG. 1 is a plan view showing a plastics rod with rubber bushings.
Figure 2:
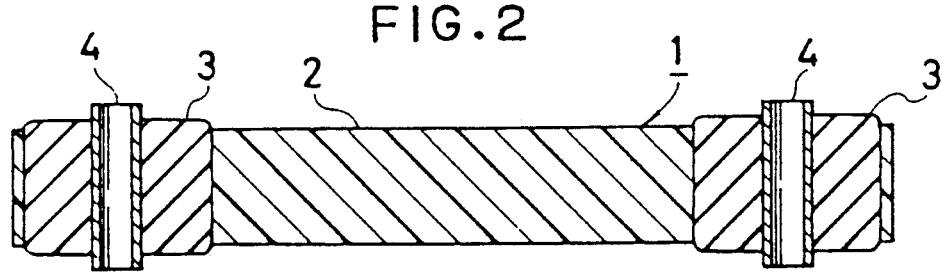
FIG. 2 is a sectional view taken in the direction of the arrows along the line 2—2 of FIG. 1.

At first, the first aspect of the present invention will be explained. According to the process pertaining to the first aspect of the present invention, the vulcanized rubber molding to be disposed in the mold undergoes chlorination treatment so that at least the surface which comes into contact with the synthetic resin is chlorinated. The chlorination treatment may be accomplished by any one of the following methods:

(1) by dipping the vulcanized rubber molding in an aqueous solution of sodium hypochlorite and hydrochloric acid.

(2) by exposing the vulcanized rubber molding to a chlorine gas atmosphere.

(3) by coating the vulcanized rubber molding with a solvent solution containing an organic compound which gives chlorine to the vulcanized rubber. (An example of the organic compound is trichloroisocyanuric acid, and an example of the solvent is ethyl acetate.)

The third method is most advantageous owing to its safety in operation and good adhesion effect.

After the chlorination treatment, the chlorinated surface of the vulcanized rubber molding is coated with an adhesive layer composed of resol-type phenolic resin and aldehyde-modified polyvinyl alcohol.

The resol-type phenolic resin is produced by reacting formaldehyde with a phenol in the presence of an alkaline catalyst. Examples of the phenol include phenol and derivatives thereof (such as xylenol and resorcinol). A preferred example of the resol-type phenolic resin used in the present invention is resol-type phenol-resorcinol resin which is a cocondensate of formaldehyde and a mixture of phenol and resorcinol. The phenol-resorcinol mixture should contain phenol and resorcinol at a molar ratio of 75:25 to 95:5, preferably 85:15 to 95:5.

The aldehyde-modified polyvinyl alcohol is obtained by reacting polyvinyl alcohol with an aldehyde. It includes, for example, polyvinyl formal resin, polyvinyl acetal resin, and polyvinyl butyral resin. Preferable among them is polyvinyl butyral resin.

According to the present invention, the resol-type phenolic resin and the aldehyde-modified polyvinyl alcohol should be used in a molar ratio of 75:25 to 99:1, preferably 85:15 to 97:3.

The adhesive may be incorporated with optional components such as solvent, pigment, and suspending agent. The total amount of the optional components should be less than 85 wt % of the total weight of the adhesive.

After the formation of the adhesive layer on the chlorinated surface, the vulcanized rubber molding is disposed in the mold and a molten resin is injected into the mold to make an integrated body.

According to the process pertaining to the first aspect of the present invention, there are no specific limitations on the degree of chlorination of the vulcanized rubber molding and the thickness of the adhesive layer to be formed on the vulcanized rubber molding. They may be properly determined according to the product dimensions, the manufacturing conditions, and the properties required.

The second aspect of the present invention will be explained. According to the process pertaining to the second aspect of the present invention, the vulcanized rubber molding to be disposed in the mold is coated with a curable adhesive layer composed mainly of chlorosulfonated polyethylene such that at least the surface which comes into contact with the synthetic resin is coated. The thickness of the adhesive layer is not specifically limited; and it may be properly determined according to the product dimensions, the manufacturing conditions, and the properties required.

The curable adhesive layer is subsequently heated for activation. The heating may be accomplished by, for example, heating the vulcanized rubber molding entirely in an oven. The heating in an oven should be carried out at an ambient temperature of 90°–140° C. for 10–90 minutes, preferably at 120° C. for 30 minutes.

After heat treatment, the vulcanized rubber molding is disposed in a mold, and a molten resin is injected into the mold to make an integrated body.

Immediately after demolding, the vulcanized rubber-synthetic resin composite structure should preferably be heated so as to improve the adhesion strength between the vulcanized rubber and the synthetic resin. The heating may be accomplished by, for example, heating the demolded composite structure in an oven or the like. The heating in an oven should be carried out at an ambient temperature of 90°–140° C. for 10–120 minutes, preferably at 120° C. for 60 minutes.

There are no specific limitations on the rubber constituting the vulcanized rubber molding. In the first aspect of the present invention, the preferred rubber is natural rubber or synthetic rubber having a carbon-carbon double bond in the structural formula. These rubbers may be used alone or in combination with one another. In the second aspect of the present invention, the preferred rubber includes butyl rubber and chloroprene rubber in addition to the above-mentioned natural rubber and synthetic rubbers. These rubbers may be used alone or in combination with another.

The rubber is incorporated with a filler (such as carbon black, silica, calcium carbonate, and mica) and commonly used additives (such as softener, antioxidant, vulcanization accelerator, and crosslinking agent). After thorough mixing, the resulting rubber compound is cured or semicured into the vulcanized rubber molding under proper conditions.

The synthetic resin used for injection molding is usually a thermoplastic resin. It includes, for example, polyamide resin, ABS resin, acetal resin, methacrylic resin, ethylene-vinyl acetate copolymer, fluoroplastics, polycarbonate, polyethylene terephthalate, polybutylene terephthalate, polypropylene, polyimide, polystyrene, polysulfone, polyphenylene sulfide, vinyl acetate resin, vinylidene chloride resin, AS resin, and vinyl chloride resin. Preferable among them are polyamide resins, especially those which have amide groups on the main chain structure. Examples of such polyamide resins include nylon-6, nylon-11, nylon-12, nylon-66, nylon-610, and copolymers and blends thereof, with the functional group partly modified or not modified. These polyamide resins may be incorporated with other thermoplastic resins and rubber components for the improvement of their physical properties. They may also be incorporated with a reinforcement (such as glass fiber, carbon fiber, and whiskers) and an inorganic filler (such as calcium carbonate and talc).

According to the process of the present invention, a vulcanized rubber molding is disposed in a mold and a molten synthetic resin is injected into the mold. Therefore, the process enables the efficient production of the vulcanized rubber-synthetic resin composite structure.

In addition, the vulcanized rubber molding previously undergoes special treatment for the improvement of adhesion properties. Therefore, firm bonding is established between the vulcanized rubber molding and the injected synthetic resin, and the resulting vulcanized rubber-synthetic resin composite structure has an extremely high bond strength.

The process of the present invention enables the efficient production of the extremely firmly bonded vulcanized rubber-synthetic resin composite structure at a low production cost and with a high productivity without causing the deterioration and deformation of the synthetic resin by heat history.

The process of the present invention will be very effective for the production of plastics rod with rubber bushings for automotive use.

The invention will be understood more readily by reference to the following Examples and Comparative Examples; however, these examples are intended to illustrate the invention and not to be construed to limit the scope of the invention.

EXAMPLE 1

A vulcanized rubber test piece conforming to ASTM D429 (Method B, for 90° peel test) was prepared from the rubber compound of the formulation shown in Table 1 below.

TABLE 1

| Formulation of Rubber Compound | |
| --- | --- |
| Component | parts by weight |
| Natural rubber | 50 |
| SBR | 50 |
| Carbon black HAF | 30 |
| Zinc oxide | 5 |
| Aromatic oil | 5 |
| Stearic acid | 1 |
| Vulcanization accelerator DM | 1 |
| Sulfur | 1.5 |

The surface of the test piece was coated by brushing an ethyl acetate solution containing 3.5±0.5 wt % of trichloroisocyanuric acid for chlorination treatment. Subsequently, the test piece was coated with an adhesive (about 5–10 μm thick) of the following formulation.

Resol-type phenolic-resorcinol resin: 18 wt % (cocondensation product of formaldehyde and a 90:10 (by weight) mixture of phenol and resorcinol)
Polyvinyl butyral resin: 2 wt %
Filler: 16 wt %
Solvent: 64 wt %

Figure 3:
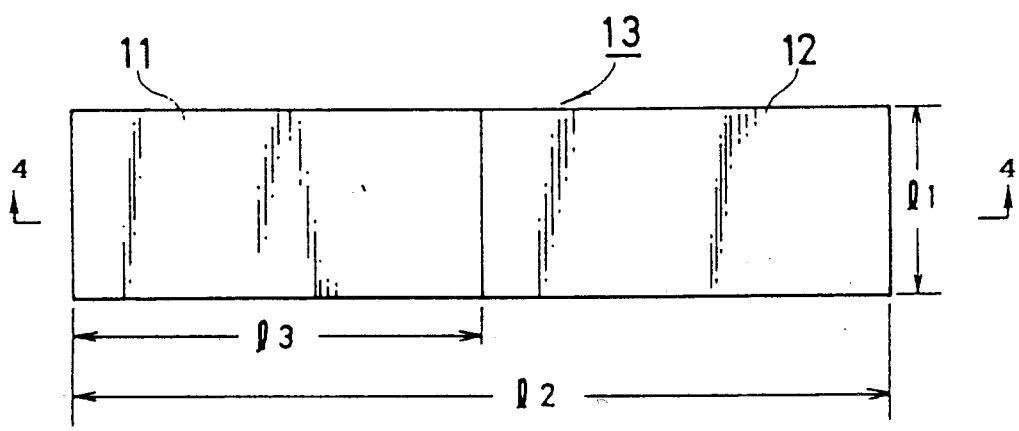
FIG. 3 is a plan view showing a test piece prepared in Examples and Comparative Examples.

The vulcanized rubber test piece which had been treated as mentioned above was disposed in a mold. The mold was filled by injection molding with completely dried nylon-66 ("CM-3001M" made by Toray Industries, Inc.). Immediately after demolding, the molding underwent post-heating in an oven at 120° C. for 60 minutes. Thus there was obtained a test piece 13 of composite structure in which vulcanized rubber 11 and polyamide resin 12 are integrated as shown in FIG. 3 (plan view) and FIG. 4 (sectional view through section 4—4 of FIG. 3). Incidentally, this test piece 13 has the following dimensions.

$l_1 = 25.4$ mm
$l_2 = 110$ mm
$l_3 = 55$ mm
$d_1 = 4$ mm
$d_2 = 7$ mm

The thus obtained test piece 13 of composite structure was tested for adhesion according to ASTM D429, Method B, 90°. The results are shown in Table 2.

EXAMPLE 2

The same procedure as in Example 1 was repeated except that post-heating was not performed after demolding. The test piece was tested for adhesion. The results are shown in Table 2.

EXAMPLE 3

The vulcanized rubber test piece obtained in Example 1 was coated with a curable adhesive (about 15–25 μm thick) composed mainly of chlorosulfonated polyethylene ("Chemlok 252" made by Lord Corp.). The test piece was preheated in an oven at 120° C. for 30 minutes. Then, the test piece was disposed in a mold and the composite structure was made in the same manner as in Example 1. The resulting composite structure was tested for adhesion. The results are shown in Table 2.

EXAMPLE 4

The same procedure as in Example 3 was repeated except that post-heating was not performed after demolding. The test piece was tested for adhesion. The results are shown in Table 2.

COMPARATIVE EXAMPLE 1

The same procedure as in Example 2 was repeated except that the vulcanized rubber test piece underwent no adhesive treatment. The test piece was tested for adhesion. The results are shown in Table 2.

COMPARATIVE EXAMPLE 2

The same procedure as in Example 2 was repeated except that the vulcanized rubber test piece underwent chlorination treatment but was not coated with the curable adhesive. The test piece was tested for adhesion. The results are shown in Table 2.

COMPARATIVE EXAMPLE 3

The same procedure as in Example 1 was repeated except that the vulcanized rubber test piece underwent no chlorination treatment but was coated with the curable adhesive. The test piece was tested for adhesion. The results are shown in Table 2.

COMPARATIVE EXAMPLE 4

The same procedure as in Example 1 was repeated except that the vulcanized rubber test piece was coated with a curable adhesive composed mainly of chlorosulfonated polyethylene. The test piece was tested for adhesion. The results are shown in Table 2.

COMPARATIVE EXAMPLE 5

The same procedure as in Example 3 was repeated except that the vulcanized rubber test piece was disposed in the mold without preheating after the application of the curable adhesive. The test piece was tested for adhesion. The results are shown in Table 2.

COMPARATIVE EXAMPLE 6

The same procedure as in Example 4 was repeated except that the vulcanized rubber test piece was disposed in the mold without preheating after the application of the curable adhesive. The test piece was tested for adhesion. The results are shown in Table 2.

COMPARATIVE EXAMPLE 7

Figure 4:
FIG. 4 is a sectional view taken in the direction of the arrows along the line 4—4 of FIG. 3.

A molding of nylon-66 ("CM-3001N" made by Toray Industries, Inc.) and an unvulcanized rubber molding of the rubber compound used in Example 1 were bonded to each other with a curable adhesive ("Chemlok 220/205" made by Lord Corp.) to give a test piece of composite structure as shown in FIGS. 3 and 4. The test piece was tested for adhesion. The results are shown in Table 2.

It is noted from Table 2 that the process of the present invention enables the easy and efficient production of the vulcanized rubber-synthetic resin composite structure by injection molding. The resulting product has an extremely high adhesion strength between the vulcanized rubber and the synthetic resin which is comparable to that achieved by the conventional cure adhesion method.

lected from the group consisting of natural rubber and synthetic rubber having a carbon-carbon double bond in a structural formula.

TABLE 2

| Items | Example No. | | | | Comparative Example No. | | | | | | |
|---|---|---|---|---|---|---|---|---|---|---|---|
| | 1 | 2 | 3 | 4 | 1 | 2 | 3 | 4 | 5 | 6 | 7 |
| Chlorination treatment | yes | yes | no | no | no | yes | no | yes | no | no | — |
| Adhesive[1] | (a) | (a) | (b) | (b) | no | no | (a) | (b) | (b) | (b) | (c) |
| Pretreatment before injection (120° C., 30 min) | no | no | yes | yes | no | no | no | yes | no | no | — |
| Post-heating after demolding (120° C., 60 min) | yes | no | yes | no | no | no | yes | yes | yes | no | — |
| Adhesion strength (kg/inch) | 40 | 31 | 41 | 28 | 0 | 13 | 0 | 0 | 9 | 0 | 38 |
| Peel and failure[2] | 100R | 90R | 100R | 85R | R/P | 60 | R/P | R/P | 25R | R/P | 95R |

Note to Table 2.
[1](a) = adhesive composed mainly of resol-type phenolic resin and aldehyde-modified polyvinyl alcohol. (b) = curable adhesive ("Chemlok 252" made by Lord Corp.) composed mainly of chlorosulfonated polyethylene. (c) = curable adhesive for top coating composed mainly of halogenated polymer and curable adhesive for primer composed mainly of phenolic resin ("Chemlok 220/205" made by Lord Corp.)
[2]R = cohesive failure in the vulcanized rubber. (The numeral indicates the ratio (%) of the part of vulcanized rubber where failure took place.) R/P = interfacial failure between the vulcanized rubber and the polyamide resin.

What is claimed is:

1. A process for producing a vulcanized rubber synthetic resin composite structure, comprising, chlorinating a surface of a vulcanized rubber molding which comes into contact with a synthetic resin to be integrally formed together, forming a layer of a curable adhesive on the chlorinated surface of the vulcanized rubber molding, said curable adhesive comprising a resol-type phenolic resin formed of a cocondensation product of formaldehyde and a phenol-resorcinol mixture, and aldehyde-modified polyvinyl alcohol, said phenol-resorcinol mixture containing phenol and resorcinol at a molar ration from 75 phenol and 25 resorcinol to 95 phenol and 5 resorcinol, said aldehyde-modified polyvinyl alcohol being selected from the group consisting of polyvinyl formal resin, polyvinyl acetal resin and polyvinyl butyral resin, said resol-type phenolic resin and aldehyde-modified polyvinyl alcohol being mixed in a ratio from 75 resol-type phenolic resin and 25 aldehyde-modified polyvinyl alcohol to 99 resol-type phenolic resin and 1 aldehyde-modified polyvinyl alcohol by weight, disposing the vulcanized rubber molding with the curable adhesive layer in a mold, injecting into the mold a molten synthetic resin over the curable adhesive layer to form the composite structure, and demolding the composite structure after setting the injected resin.

2. A process set forth in claim 1, wherein the rubber component of the vulcanized rubber constituting the vulcanized rubber molding is at least one member selected from the group consisting of natural rubber, synthetic rubber having a carbon-carbon double bond in a structural formula.

3. A process set forth in claim 1, wherein the synthetic resin is a polyamide resin.

4. A process for producing a vulcanized rubber-synthetic resin composite structure, comprising, forming a layer of a curable adhesive on a surface of a vulcanized rubber molding, said curable adhesive comprising chlorosulfonated polyethylene, heating the vulcanized rubber molding with the curable adhesive at 90°–140° C. for 10–90 minutes for activating the curable adhesive, disposing the vulcanized rubber molding with the curable adhesive in the mold in a heated condition, injecting into the mold a molten synthetic resin over the curable adhesive to form a composite structure, demolding the composite structure after setting of the injected resin, and post-heating the composite structure at 90°–140° C. for 30–120 minutes to strengthen adhering strength between the synthetic resin and the vulcanized rubber.

5. A process set forth in claim 4, wherein the rubber component of the vulcanized rubber constituting the vulcanized rubber molding is at least one member selected from the group consisting of natural rubber, synthetic rubber having a carbon-carbon double bond in a structural formula.

6. A process set forth in claim 4, wherein the synthetic resin is a polyamide resin.

7. The process set forth in claim 4, wherein the rubber component of the vulcanized rubber constituting the vulcanized rubber molding is selected from the group consisting of butyl rubber and chloroprene rubber.

* * * * *